United States Patent
Mermoud et al.

(10) Patent No.: US 11,438,406 B2
(45) Date of Patent: Sep. 6, 2022

(54) ADAPTIVE TRAINING OF MACHINE LEARNING MODELS BASED ON LIVE PERFORMANCE METRICS

(71) Applicant: Cisco Technology, Inc., San Jose, CA (US)

(72) Inventors: Grégory Mermoud, Veyras VS (CH); Jean-Philippe Vasseur, Saint Martin d'Uriage (FR); Pierre-André Savalle, Rueil-Malmaison (FR); Vinay Kumar Kolar, San Jose, CA (US); David Tedaldi, Zurich (CH)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 16/865,517

(22) Filed: May 4, 2020

(65) Prior Publication Data
US 2021/0344745 A1 Nov. 4, 2021

(51) Int. Cl.
*H04L 67/10* (2022.01)
*H04W 4/02* (2018.01)
(Continued)

(52) U.S. Cl.
CPC ............ *H04L 67/10* (2013.01); *G06K 9/6227* (2013.01); *G06K 9/6262* (2013.01); *G06N 20/00* (2019.01);
(Continued)

(58) Field of Classification Search
CPC .. G06K 9/6203; G06K 9/6227; G06K 9/6262; G06N 20/00; H04L 67/10; H04L 41/16
See application file for complete search history.

(56) References Cited

U.S. PATENT DOCUMENTS 10,452,467 B2   10/2019   Estrada et al.
2013/0290223 A1*  10/2013  Chapelle ................. G06N 20/00
                                                         706/12
(Continued)

FOREIGN PATENT DOCUMENTS

WO   WO-2019/186194 A2   10/2019

OTHER PUBLICATIONS

Chen, et al., "Incremental Quantile Estimation for Massive Tracking", In Proceedings of the sixth ACM SIGKDD international conference on Knowledge discovery and data mining Aug. 2000, pp. 516-522, ACM.
(Continued)

*Primary Examiner* — Thomas J Dailey
(74) *Attorney, Agent, or Firm* — Behmke Innovation Group LLC; Kenneth J. Heywood; Jonathon P. Western

(57) ABSTRACT

In one embodiment, a device deploys a first machine learning model to an inference location in a network. The first machine learning model is used at the inference location to make inferences about the network. The device receives, from the inference location, an indication that the first machine learning model is exhibiting poor performance. The device identifies a corrective measure for the poor performance that minimizes resource consumption by a model training pipeline of the device. The device deploys, based on the corrective measure, a second machine learning model to the inference location. The second machine learning model is used in lieu of the first machine learning model to make the inferences about the network.

20 Claims, 7 Drawing Sheets

(51) Int. Cl.
*G06N 20/00* (2019.01)
*G06K 9/62* (2022.01)
*G06V 10/75* (2022.01)
*H04L 41/16* (2022.01)

(52) U.S. Cl.
CPC .......... *G06V 10/7515* (2022.01); *H04L 41/16* (2013.01); *H04W 4/02* (2013.01)

(56) References Cited

U.S. PATENT DOCUMENTS

| | | | |
|---|---|---|---|
| 2014/0122387 A1* | 5/2014 | Chi | G06N 20/00 706/12 |
| 2018/0375720 A1* | 12/2018 | Yang | H04L 29/08 |
| 2019/0213504 A1* | 7/2019 | Vasseur | G06N 20/00 |
| 2019/0239100 A1* | 8/2019 | Pandey | H04L 41/16 |
| 2019/0325354 A1 | 10/2019 | Rajnayak et al. | |
| 2019/0370218 A1* | 12/2019 | Di Pietro | G06K 9/6263 |
| 2019/0370686 A1 | 12/2019 | Pezzillo et al. | |
| 2020/0073834 A1* | 3/2020 | Hagdahl | G06N 20/00 |
| 2021/0081837 A1* | 3/2021 | Polled | G06N 5/022 |
| 2021/0097431 A1* | 4/2021 | Olgiati | G06N 5/046 |

OTHER PUBLICATIONS

Guan, et al., "Ensemble of Bayesian Predictors and Decision Trees for Proactive Failure Management in Cloud Computing Systems", Journal of Communications, vol. 7, No. 1, Jan. 2012, Academy Publisher.

Ma, et al., "Frugal Streaming for Estimating Quantiles: One (or two) Memory Suffices", online: https://arxiv.org/pdf/1407.1121.pdf, Jul. 2014, 12 pages, Arvix.org.

\* cited by examiner

ADAPTIVE TRAINING OF MACHINE LEARNING MODELS BASED ON LIVE PERFORMANCE METRICS

TECHNICAL FIELD

The present disclosure relates generally to computer networks, and, more particularly, to the adaptive training of machine learning models based on live performance metrics.

BACKGROUND

Networks are large-scale distributed systems governed by complex dynamics and very large number of parameters. In general, network assurance involves applying analytics to captured network information, to assess the health of the network. For example, a network assurance service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

With the recent proliferation of machine learning techniques, new opportunities have arisen with respect to monitoring a network. Indeed, machine learning has proven quite capable of analyzing complex network patterns and identifying problems that might otherwise be missed by a network administrator. In some cases, a machine learning-based network assurance system may even be able to predict problems before they occur, allowing for corrective measures to be taken in advance.

From a resource consumption standpoint, applying a machine learning model to a set of data is far less resource-intensive than training the model. For instance, training some deep neural networks requires complex, graphics processing unit (GPU)-based infrastructure. Similarly, model training using a very large training dataset can often take a relatively long amount of time. In addition, trying too many models (e.g., with respect to a validation dataset) may lead to overfitting, leading to poor performance.

DESCRIPTION OF EXAMPLE EMBODIMENTS

Overview

Figure 1A:
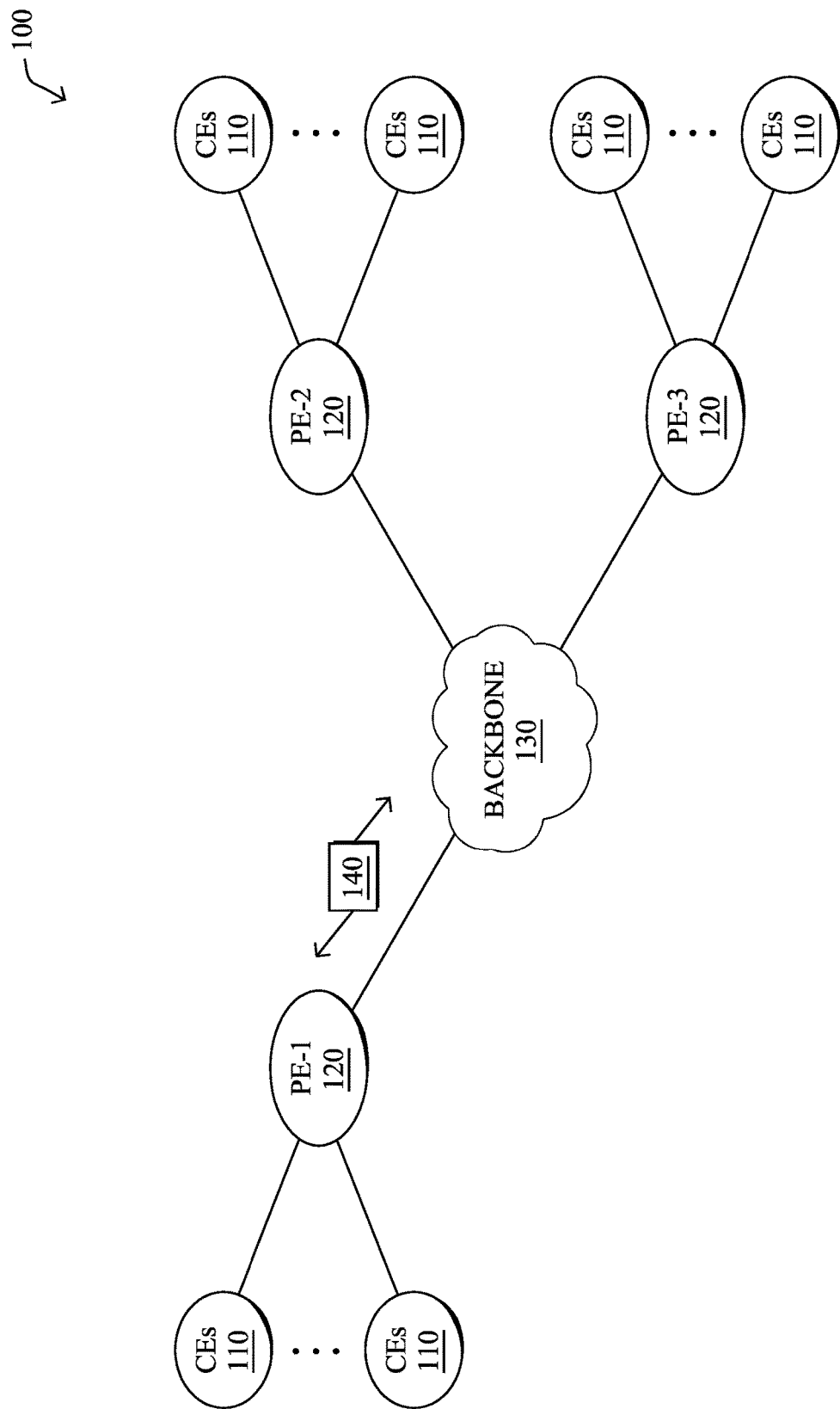
FIGS. 1A-1B illustrate an example communication network.

According to one or more embodiments of the disclosure, a device deploys a first machine learning model to an inference location in a network. The first machine learning model is used at the inference location to make inferences about the network. The device receives, from the inference location, an indication that the first machine learning model is exhibiting poor performance. The device identifies a corrective measure for the poor performance that minimizes resource consumption by a model training pipeline of the device. The device deploys, based on the corrective measure, a second machine learning model to the inference location. The second machine learning model is used in lieu of the first machine learning model to make the inferences about the network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
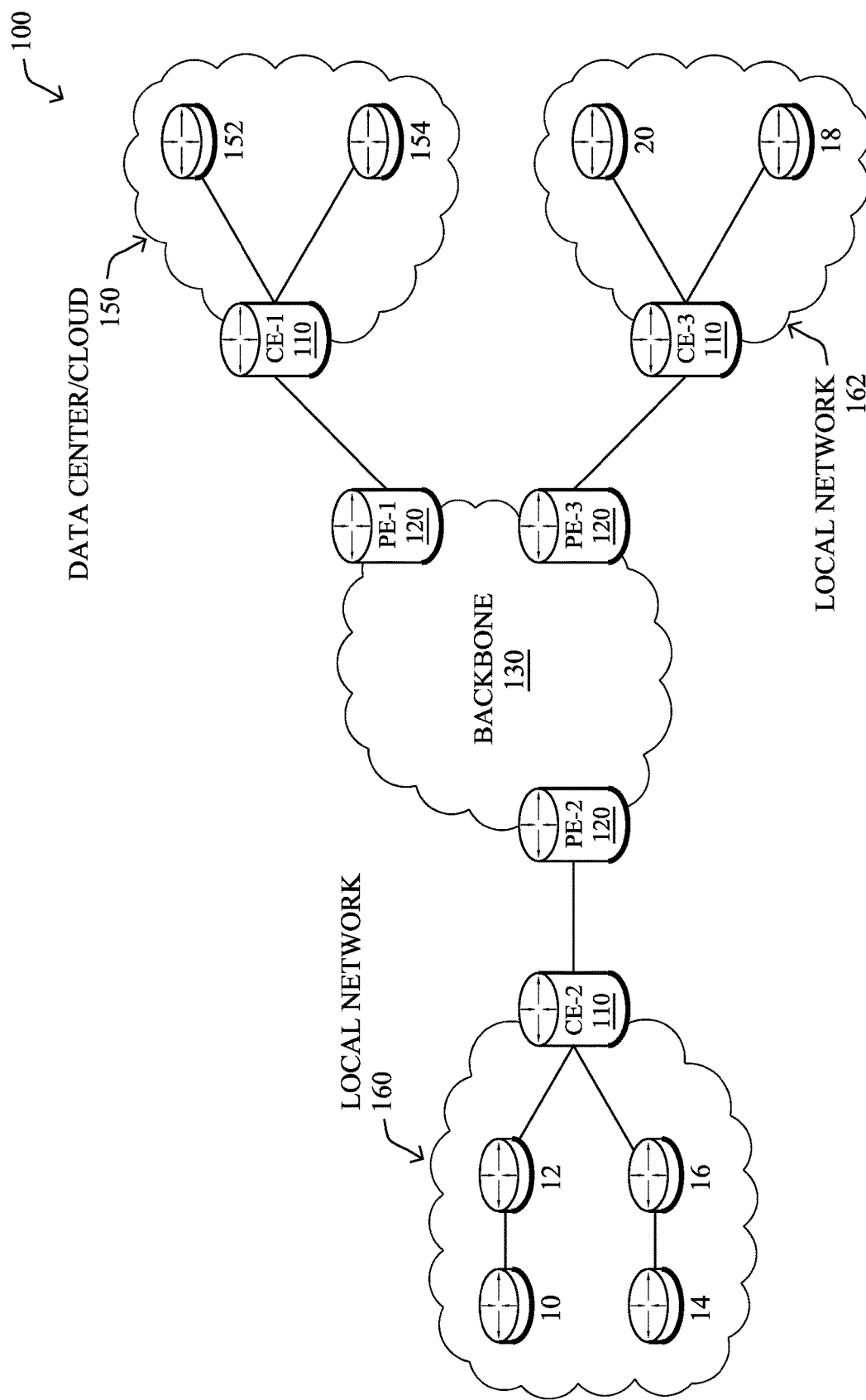

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLNs transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
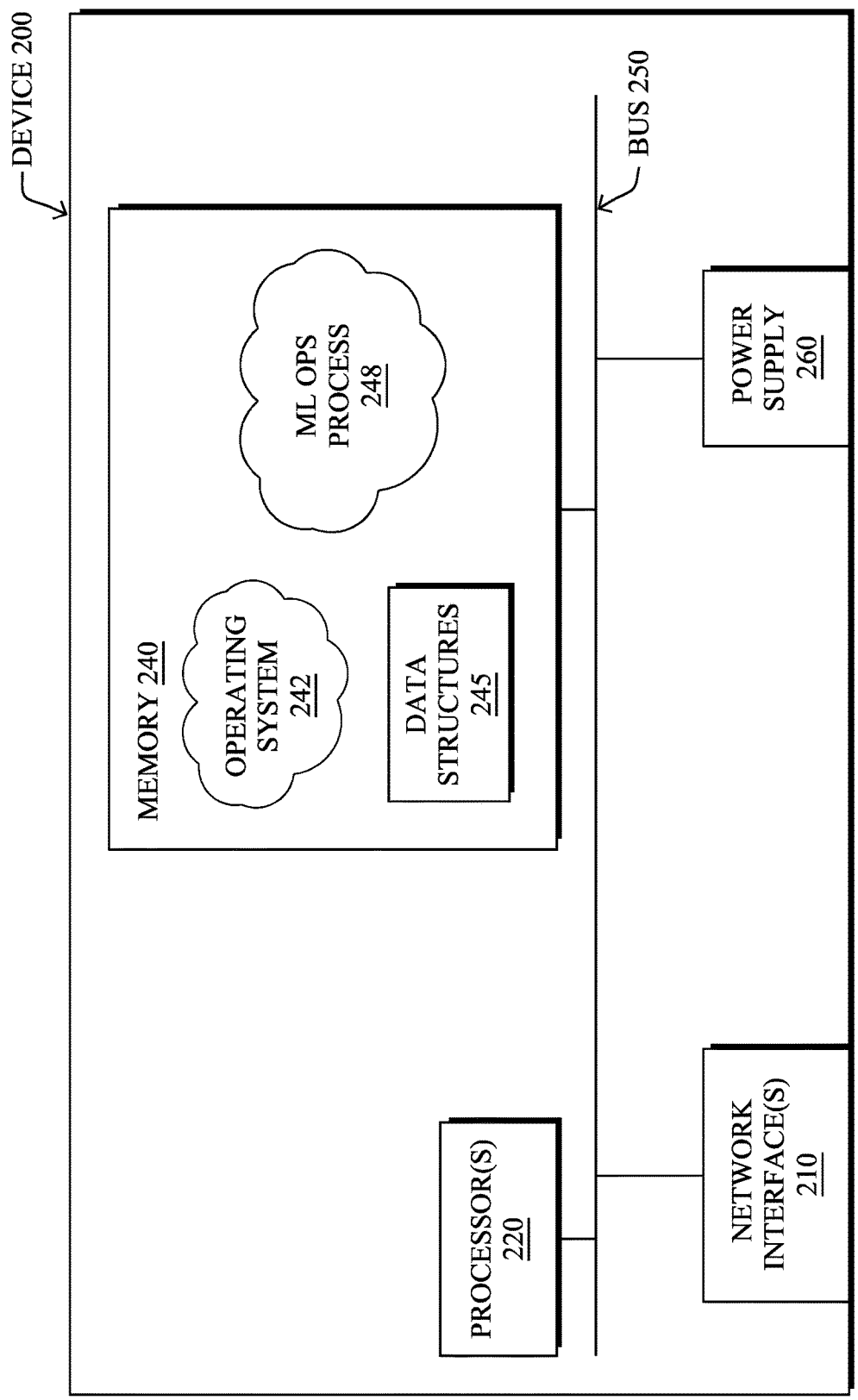
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a machine learning operations (ML Ops) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

ML Ops process 248 includes computer executable instructions that, when executed by processor(s) 220, cause device 200 to perform ML Ops functions as part of a network monitoring infrastructure for one or more networks. In general, ML Ops refers to the mechanisms by why machine learning models are created, deployed, and monitored over time. More specifically, in various embodiments, ML Ops process 248 may oversee the operations of one or more network monitoring services that utilize machine learning, such as a network assurance service, a device classification service, a network security service, or the like.

In some embodiments, ML Ops process 248 may itself utilize machine learning techniques, to monitor and adjust the operations of any number of ML-based network services. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, ML Ops process 248 may employ one or more supervised, unsupervised, or semi-supervised machine learning models. Generally, supervised learning entails the use of a training set of data, as noted above, that is used to train the model to apply labels to the input data. For example, the training data may include samples of 'good' operations and 'bad' operations and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that ML Ops Process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) ANNs (e.g., for non-linear models), replicating reservoir networks (e.g., for non-linear models, typically for time series), random forest classification, deep learning models, or the like.

The performance of a machine learning model can be evaluated in a number of ways based on the number of true positives, false positives, true negatives, and/or false negatives of the model. For example, consider the case of a machine learning model that predicts whether a network tunnel is likely to fail. In such ca case, the false positives of the model may refer to the number of times the model incorrectly predicted that the tunnel would fail. Conversely, the false negatives of the model may refer to the number of times the model incorrectly predicted that the tunnel would not fail. True negatives and positives may refer to the number of times the model correctly predicted whether the tunnel would operate as expected or is likely to fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
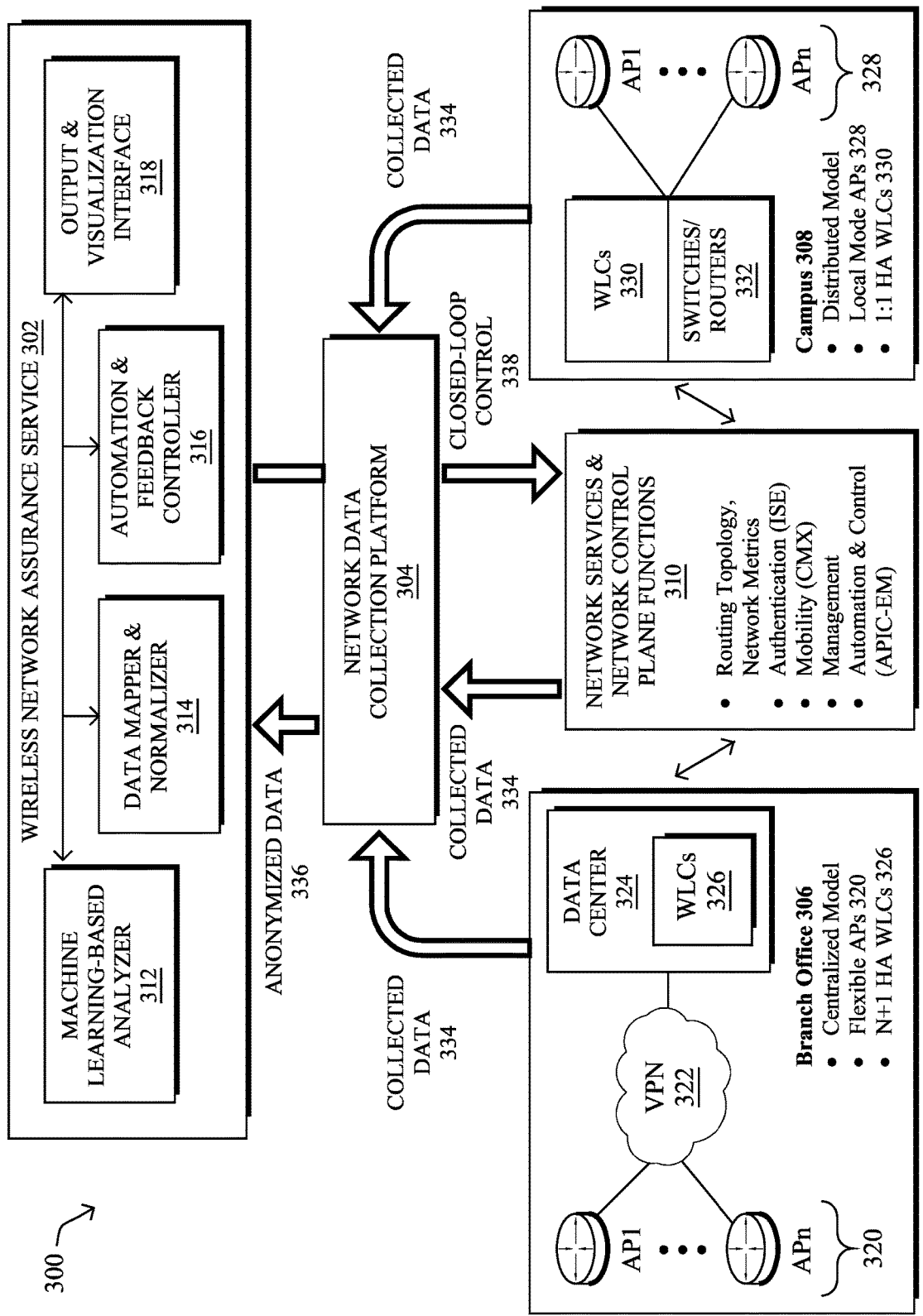
FIG. 3 illustrates an example network assurance system that uses machine learning to monitor a network.

FIG. 3 illustrates an example network assurance system 300 that uses machine learning to monitor a network, according to various embodiments. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

As shown, at the core of network assurance system 300 may be a wireless network assurance service 302 that leverages machine learning in support of cognitive analytics for the network, predictive analytics (e.g., models used to predict user experience, etc.), troubleshooting with root cause analysis, and/or trending analysis for capacity planning. Generally, network assurance system 300 may support monitoring for both wireless and wired networks, as well as LLNs/IoT networks.

In various embodiments, wireless network assurance service 302 may oversee the operations of the network of an entity (e.g., a company, school, etc.) that includes any number of local networks. For example, wireless network assurance service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both wireless network assurance service 302 and the monitored network of the entity. Accordingly, in some embodiments, wireless network assurance service 302 may be located in the cloud or other centralized location, allowing service 302 to oversee the functions of any number of different networks across any number of entities. In further embodiments, some or all of the functions of service 302 may be implemented directly in the network under scrutiny (e.g., implemented on-premise).

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIB S) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by wireless network assurance service 302. In some cases, network data collection platform may also anonymize collected data 334 before providing the anonymized data 336 to wireless network assurance service 302.

In some cases, wireless network assurance service 302 may include a data mapper and normalizer 314 that receives the collected and/or anonymized data 336 from network data collection platform 304. In turn, data mapper and normalizer 314 may map and normalize the received data into a unified data model for further processing by wireless network assurance service 302. For example, data mapper and normalizer 314 may extract certain data features from data 336 for input and analysis by wireless network assurance service 302.

In various embodiments, wireless network assurance service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing wireless network assurance service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, wireless network assurance service 302 will be able to identify the major root cause of this predicted condition, thus allowing wireless network assurance service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, wireless network assurance service 302 may use the predicted user experiences from analyzer 312 to provide information to a network administrator or architect in real-time and enable closed loop control over the network by wireless network assurance service 302, accordingly. For example, wireless network assurance service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Wireless network assurance service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Wireless network assurance service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, wireless network assurance service 302 may further include an automation and feedback controller 316 that provides closed-loop control instructions 338 back to the various devices in the monitored network. For example, based on the predictions by analyzer 312, the evaluation of any predefined health status rules by wireless network assurance service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

Figure 4:
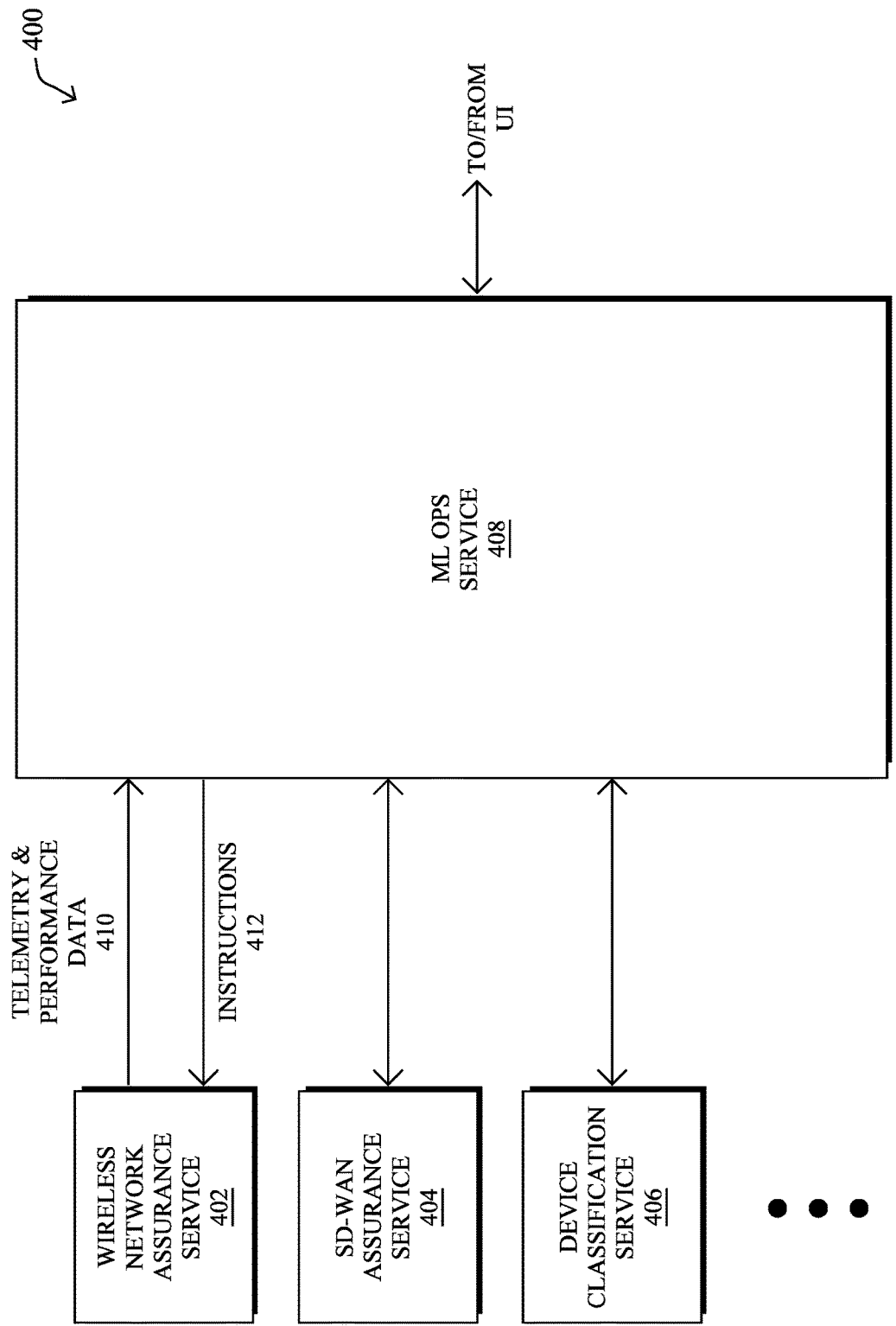
FIG. 4 illustrates an example machine learning operations (ML Ops) architecture.

FIG. 4 illustrates an example ML Ops architecture 400, according to various embodiments. At the core of architecture 400 is a machine learning (ML) operations (Ops) service 408 (e.g., as provided by one or more devices executing ML Ops process 248) that oversees the operations of any number of machine learning-based services/systems that each monitor one or more computer networks.

For example, as shown, ML Ops service 408 may oversee the operation of a wireless network assurance service 402 that uses machine learning to monitor a wireless network (e.g., wireless network assurance service 302 shown in FIG. 3 or a similar service), a software-defined wide area network (SD-WAN) assurance service 404 that uses machine learning to monitor an SD-WAN (e.g., to predict tunnel failures, etc.), a device classification service 406 that uses machine learning to classify devices in a network by device type, based on their behaviors, and/or any other machine learning-based network services (e.g., intrusion detection systems, other security services, etc.).

During operation, a given network monitoring service may provide to ML Ops service 408 data regarding the telemetry data that it collects and is ingested by its machine learning model(s), as well as performance data regarding the performance of the model(s). For example, as shown, wireless network assurance service 402 may provide telemetry and performance data 410 to ML Ops service 408. In turn, ML Ops service 408 may assess the provided data, to determine whether there are any irregularities or other issues present in the ingested data and/or performance issues associated with the machine learning model. If ML Ops service 408 detects either condition, service 408 may initiate corrective measures such as sending an alert to a user interface (UI) or instructions back to the monitoring service. For example, service 408 may send instructions 412 to wireless network assurance service 402 that adjust how or when its machine learning model assesses its collected data (e.g., by disabling the model under certain conditions, etc.). In further cases, instructions 412 may even trigger model retraining.

More specifically, ML Ops service 408 may manage the various stages of the lifecycles of the machine learning models employed by a network monitoring service. These stages generally include the following:

1. The data ingestion stage logs data indicative of the quality of the data ingested by the monitoring service, which is provided to ML Ops service 408 for analysis (e.g., on a daily basis). For example, the data quality information may summarize the number of different entity types observed in the network (e.g., number of radios, APs, tunnels, etc.), failures or other events observed in the network, etc., for a given time period. ML Ops service 408 may use this information to detect problems related to the collection of network data by the monitoring service.
2. Similarly, the data from the extract, transform, and load (ETL) functions of the monitoring service is collected and sent to ML Ops service 408 for analysis (e.g., weekly records). For example, this information may be indicative of an average throughput for the network, onboarding times, onboarding failures, tunnel downtimes, throughputs during tunnel failures, etc. ML Ops service 408 may analyze the distributions and changes in these metrics, to detect skewed data that can lead to poor model performance.
3. The accuracy and other metrics regarding the machine learning models executed by the monitoring service is also sent to ML Ops service 408 for analysis (e.g., on a daily basis). For example, such information may be indicative of the width of the anomaly band of an anomaly detector, relevancy scores for detected anomalies, information regarding false positives or negatives by the model, true positives or negatives by the model, the recall or precision of the model, or the like. ML Ops service 408 may use this information to track changes in the performance of the model over time and other model-related issues, so as to initiate corrective measures.
4. In many cases, experimentation is also performed over time to select the 'best' model(s) for use by a monitoring service in production. ML Ops service 408 may further oversee this activity, to provide insights into the performance of a given model with respect to different datasets, networks, and/or time ranges.

The unified architecture 400 shown allows ML Ops service 408 to oversee the operations of multiple machine learning-based network monitoring services at once. In other words, ML Ops service 408 may itself be a standalone service that interfaces with any number of network monitoring services, such as services 402-406, to manage the lifecycles and health of their machine learning models.

As noted above, machine learning can be used for a variety of reasons in a computer network, such as to monitor the health/performance of the network, identify devices on the network, protect the network from security threats, and the like. In general, any machine learning system has two primary data pipelines: a model training pipeline and an inference pipeline. The model training pipeline collects telemetry data and divides it into training and validation datasets. A model is then trained using the training dataset and its performance validated against the validation dataset. If the performance of the model is acceptable with respect to the validation dataset, it may be deployed to analyze the target network(s). Once the model is deployed, the inference pipeline collects and feeds telemetry data from the target network(s) to the model, so that the model can make inferences about the target network(s).

Comparatively, an inference pipeline consumes far fewer resources than its corresponding model training pipeline. This is particularly true for deep neural networks that require graphics processing unit (GPU)-based infrastructure or when working with very large datasets covering large networks over potentially long periods of time. In addition, trying too many models may lead to overfilling (e.g., to the validation dataset), leading to poor performance, in practice.

While an inference pipeline typically must process every sample from its target network, a training pipeline can be controlled in a more fine-grained fashion and model training performed only when necessary. For instance, once a model has been trained, retraining may not be needed unless the data distribution underlying the model has shifted, when the performance of the model has become unacceptable, or when more advanced model architectures have been developed.

Large-scale machine lea stems may use hundreds of different models for a variety of use cases, and these models are typically chained with each other in such a way that they depend on each other. The key challenge faced by such systems is the heterogeneity of modeling conditions, and the resulting abundance of models to be monitored, maintained, and distributed across the production infrastructure. Naïve strategies based on systematic re-training are extremely wasteful and expensive, and often suboptimal from a performance standpoint.

—Adaptive Training of Machine Learning Models Based on Live Performance Metrics—

The techniques herein introduce a series of mechanisms to monitor the performance of machine learning models in production and automatically decide when to train new models or, conversely, delay model training. In some aspects, the techniques herein are well suited for situations where more than one machine learning model is being deployed.

Specifically, according to one or more embodiments of the disclosure as described in detail below, a device deploys a first machine learning model to an inference location in a network. The first machine learning model is used at the inference location to make inferences about the network. The device receives, from the inference location, an indication that the first machine learning model is exhibiting poor performance. The device identifies a corrective measure for the poor performance that minimizes resource consumption by a model training pipeline of the device. The device deploys, based on the corrective measure, a second machine learning model to the inference location. The second machine learning model is used in lieu of the first machine learning model to make the inferences about the network.

Illustratively, the techniques described herein may be performed by hardware, software, and/or firmware, such as in accordance with the ML Ops process 248, or another process, which may include computer executable instructions executed by the processor 220 (or independent processor of interfaces 210) to perform functions relating to the techniques described herein.

Figure 5:
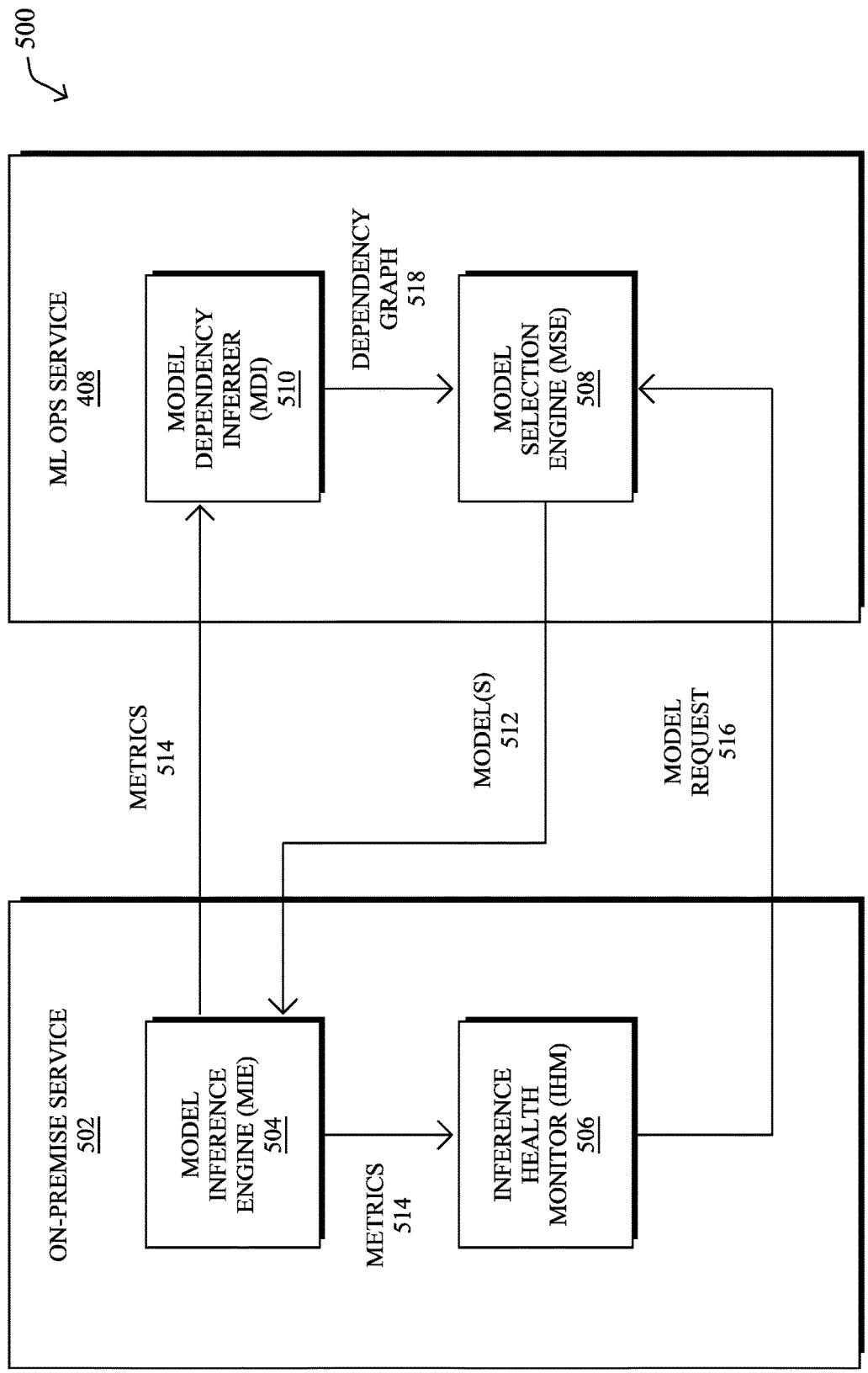
FIG. 5 illustrates an example architecture for the adaptive training of machine learning models based on live performance metrics.

Operationally, FIG. 5 illustrates an example architecture 500 for the adaptive training of machine learning models based on live performance metrics, according to various embodiments. Continuing the example of FIG. 4, assume that there is an on-premise service 502 (e.g., any of services 402-406, etc.) that leverages machine learning models trained by ML Ops Service 408 to monitor a network on-premise. As shown, architecture 500 may include any or all of the following components: a model inference engine (MIE) 504, an inference health monitor (IHM) 506, a model selection engine (MSE) 508), and/or a model dependency inferrer (MDI) 510. For example, service 502 may leverage application programming interfaces (APIs) of ML Ops service 408, allowing service 408 to oversee the operations of the machine learning components of on-premise service 502. In other embodiments, the functionalities of ML Ops service 408 may be integrated directly into on-premise service 502.

To better describe the operation of architecture 500, assume that there are k-number of machine learning algorithms $M_1, \ldots, M_K$ that have been deployed to on-premise service 502. These algorithms may or may not depend on each other, such as one using the output of another as its own input. In addition, they may or may not share features, which are given as a set $FS(M_i) = \{F_1, F_2, \ldots, F_N\}$.

Every learning algorithm may lead to a very large number of possible models that are, for the sake of generality, denoted as $M_i[c]$, where c is a configuration that denotes different hyperparameters, training sets, or training settings. For instance, the same learning algorithm $M_i$ may lead to different models $M_i[c]$ and $M_i[c']$ if some hyperparameter is changed in c, thus leading to a different configuration c'. Note that it is common to have more than one model for a given objective/use cases. For example, there may be different models for a particular network, a group of networks, or even one model per network entity, as in the case of predicting SD-WAN failures. In other cases, an ensemble of models can be used in parallel and their predictions aggregated, to make the final inference (e.g., majority voting in classification tasks, or averaging in regression tasks).

Each model has a given performance metric $P(M_i[c])$, typically given as a set of one or more metrics such as accuracy, precision, recall, etc. These performance metrics may be computed at training time, validation time, or at inference time (also called test time), and are denoted $P_{train}(M_i[c])$, $P_{val}(M_i[c])$ or $P_{test}(M_i[c])$, respectively. Furthermore, $P_{test}(M_i[c])$ typically varies over time, such that we denote it $P_{test}(M_i[c], t)$.

In various embodiments, architecture 500 includes model inference engine (MIE) 504, which is typically hosted directly on the networking gear (e.g. router, switch, network controller, etc.), but could also be hosted elsewhere, as well. During operation, MIE 504 receives trained models 512, $M_i[c]$, from model selection engine (MSE) 508, described in greater detail below. In short, MSE 508 selects or trains model(s) 512 based on a large dataset (e.g., in the cloud) using a variety of strategies and then push model(s) 512 down to MIE 504. In turn, MIE 504 uses trained model(s) 512 to make inferences about its network, to provide predictions for the rest of the system. Note that MIE 504 may also alternate between multiple models 512 for a given use case.

In some cases, MIE 504 may receive an ensemble of trained models 512 from MSE 508. During use, MIE 504 may compute the final output of the ensemble using variety of strategies, such as conducting a 'vote' among the models 512, averaging the outputs of the models 512, or using some heuristic-based selection strategy. For instance, the models 512 in the ensemble may have different input features and MIE 504 may switch between using different models 512, depending on the availability of their input features. In another embodiment, MIE 504 may switch between using different models 512 based on an instruction to do so from MSE 508.

In various embodiments, architecture 500 may also include inference health monitor (IHM) 506, which is responsible for monitoring the health of the models 512 currently used by MIE 504 to make inferences about the network. Typically, IHM 506 will be implemented as a lightweight module that is executed in conjunction with MIE 504 directly on a networking device in the network and receives model performance metrics 514 for the model used by MIE 504 to make an inference. IHM 506 may process all model performance metrics locally and make a model request 516 to MSE 508, as needed, for new models 512 that may exhibit better performance. In particular, IHM 506 collects all model performance metrics from MIE 504 at inference time, and compares them to training and validation metrics that are associated to this model 512. Multiple scenarios may occur that require the re-training of $M_i$:

The time-series $P_{test}(M_i[c], t)$ exhibit a change point, especially if it is decreasing.

The time-series $P_{test}(M_i[c], t)$ exhibit a downward long-term trend.

The test error is significantly higher than the train error and validation error.

In all of these cases, IHM 506 may send a model request 516 to MSE 508 for a new model. For instance, model request 516 may include contextual metadata such as key moments of the distribution of input features of the current model, etc. In its lightweight embodiment, IHM 506 may use optimized strategies to measure and detect change points, trends, and metadata. In particular, it may use a streaming algorithm such as incremental quantile estimation, frugal streaming for estimating quantiles, or another suitable approach, to estimate some key percentiles of the metrics and input features using only a very limited amount of memory.

As noted, another component of architecture 500 is model selection engine (MSE) 508, in various embodiments. Typically, MSE 508 is cloud-hosted, but could also be implemented on-premise. During execution, MSE 508 may receive a model request 516 and, in turn, provide a new model 512 to MIE 504 in an attempt to mitigate the deterioration in model performance observed by IHM 506. To this end, MSE 508 may dynamically: (1) determine the optimal configuration c for $M_i$, and (2) select another available model that matches the current data patterns being observed or, when necessary, retrain the model incrementally or from scratch.

In one embodiment, MSE 508 may make use of a variety of techniques taken from the AutoML techniques, ranging from feature selection, architecture search, hyperparameter optimization, and the like. Importantly, depending on model request 516 received from IHM 506, MSC 508 may adapt its strategy to improve the situation. For instance, in situations where the test error is significantly higher than the training and validation error, this may be an indication of a lack of generalization, which may require a bigger training dataset.

Similarly, upward trends in errors may be an indication of a slow drift in the underlying feature distribution. In this case, a full-blown optimization may not be necessary and MSE 508 may simply opt for incremental re-training of the model with more recent data or rescaling the input features of the model, thus leading to resource cost savings by avoiding complex and expensive searches.

MSE 508 can also enforce constraints on the number of models that are trained and evaluated in each scenario. In addition to training costs considerations, training too many models may lead to some form of overfitting to the validation set when present), the extreme case being enumerating all possible models. Although impractical in practice, these effects may be tracked by MSE 508 while trying out a large, but realistic, number of models. In turn, MSE 508 can use this information to form heuristics that control its approach to a particular scenario, given a resource budget.

In another embodiment, MSE 508 may select a pre-existing model to be sent to MIE 504 as a replacement. Indeed, in some cases, a model may already exist that is likely to perform better than the current model of MIE 504 and that model can be used directly without any type of re-training. This is typically the case when the distribution of the input features of the model has changed. When this occurs, it is often the case that the same situation has already been observed elsewhere in the network or in another network and an appropriate model for the situation is already available at MSE 508. To this end, MSE 508 may maintain a database of all previously trained models along with their performance metrics and some associated metadata (e.g., distribution of input features). In one embodiment, MSE 508 may also apply advanced techniques to further tune the model, prior to deploying the model to MIE 504, such as retraining the existing model further on data from on-premise service 502.

In yet another embodiment, MSE 508 may evaluate the model performance metrics across multiple deployment locations (e.g., different networking devices or entities such as WLCs, SD-WAN tunnels, etc.), to select the model(s) 512 for deployment to MIE 504. This is particularly true in cases in which ML Ops Service 408 oversees the deployment of machine learning models to any number of different inference locations across any number of different networks. Accordingly, MSE 508 may receive inference health messages from the corresponding IHMs at those locations. In some cases, inference may only be bad at a few locations.

For instance, in an SD-WAN, it is consistently seen that failures at certain tunnels are order of magnitude higher than other tunnels. Specifically, it has been seen that approximately 1% of tunnels in an SD-WAN can contribute up to 80% of the total number of tunnel failures. Hence, it is possible that a few inference locations using a particular model may experience unfairly high or low inference metrics than others. In such a case, MSE 508 might trigger a re-training of the model based on the number of inference locations affected. For example, MSE 508 may only re-train the model if a threshold number of its deployment locations exhibit low accuracy. In another approach, MSE 508 may ignore all inference locations whose inference metrics exhibit high variance, (indicating that inference metrics are always unstable) and select a model for stable entities.

In another embodiment, MSE 508 might consider serving personalized, best models (among existing models) to each inference location, such as MIE 504. For example, model A might perform well to make inferences for SD-WAN tunnels that experience very high failures, while model B might perform better for more stable tunnels. In such a case, MSE 508 may infer this best match by matching the input data features at the inference location to the ones used for model training and push the respective best model(s) to each of the inference locations.

In some embodiments, MSE 508 may also produce local model selection heuristics that can be used by MIE 504 to support an ensemble of models. These heuristics are then executed on-premise by MIE 504, which support the ensemble of models 512 deployed to MIE 504 and some arbitrary strategy for computing their outputs. For instance, MIE 504 may periodically report some sudden, yet transient, drop in model performance via metrics 514. Assuming that these drops are either: 1.) seasonal or 2.) correlated with some other event (e.g., missing feature, router restart, etc.), MSE 508 may create an ensemble of models along with a strategy to switch between based on a schedule (if the drops are seasonal) or based on a trigger (if an event is causing the issue). Then, MIE 504 will keep both models and switch between the two automatically.

Optionally, architecture 500 may also include a model dependency inferrer (MDI) 510 that take into account the dependencies among the various learning algorithms $M_1, \ldots M_K$, to produce a dependency graph 518 for use by MSE 508, in some embodiments. These dependencies are critical since a retraining of a given model by MSE 508 often requires a retraining of all other algorithms that depend on its predictions as input. Therefore, when a given algorithm experiences a decrease in performance, resulting in IHM 506 sending a model request 516, MSE 508 may leverage dependency graph 518 to proactively select or re-train dependent models that have not yet experienced a drop-in performance and push them to MIE 504.

Dependencies among models may be explicitly provided by developers but, more often than not, these dependencies may be implicit (e.g., if some issue detection algorithm is retrained, then any relevance learning algorithm should be retrained, as they are coupled via the user). Thus, MDI 510 may receive the performance metrics 514 of each deployed model 512 across the various inference locations, such as MIE 504, and look for correlations in time that would be indicative of a dependency between models. The resulting correlation matrix can be binarized and turned into an adjacency matrix that represents the dependency graph 518. In turn, this dependency graph 518 can be made available to MSE 508 for proactive re-training of dependent models.

In another embodiment, MDI 510 might infer the redundancy of models if the performance metrics are similar across networks. In such a case, MDI 510 may decide to keep one "best" model among many correlated models and prune the rest from the model database of MSE 508. It will then send a message to MSE 508 to proactively push the single model to all corresponding inference locations.

Figure 6:
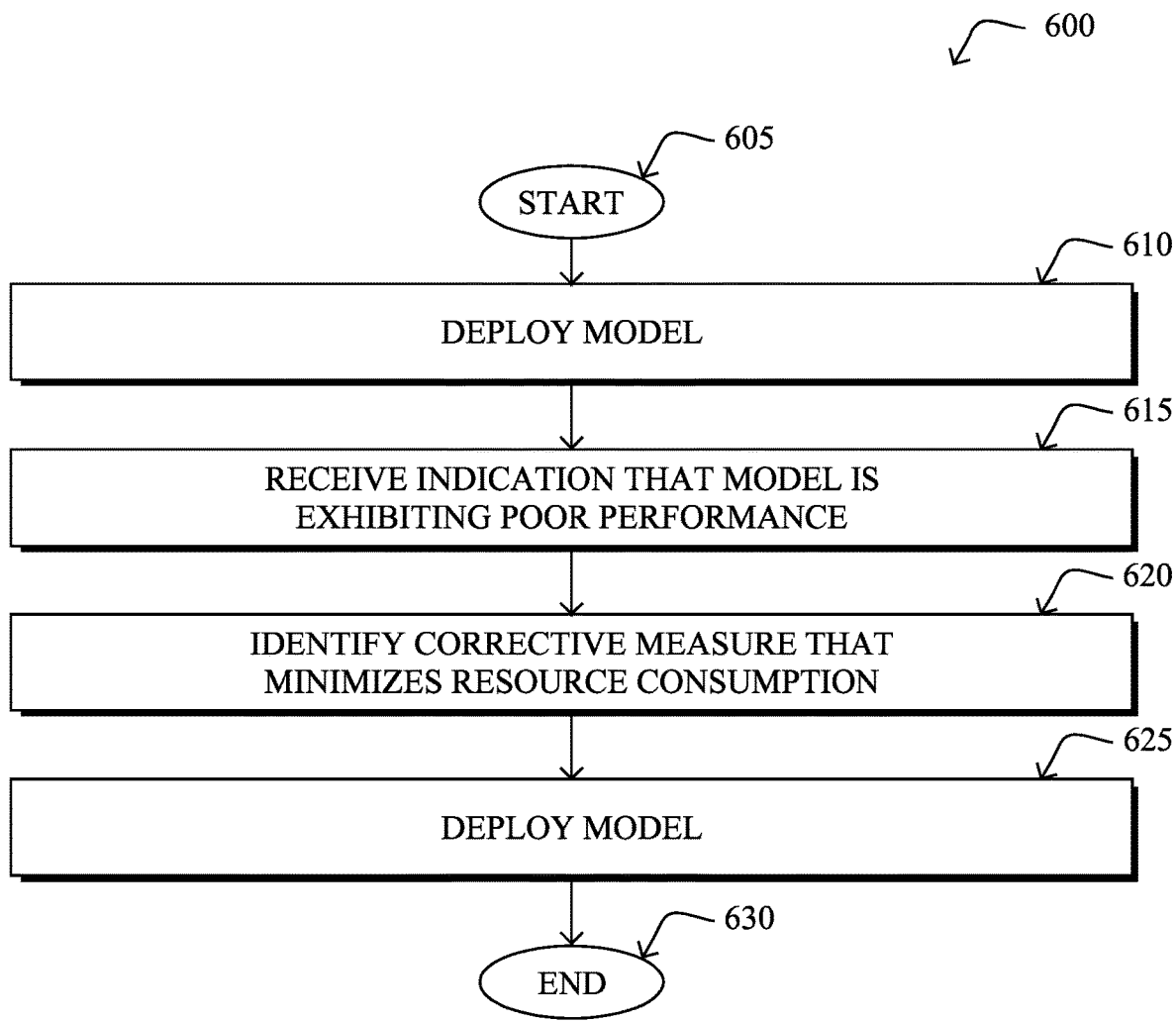
FIG. 6 illustrates an example simplified procedure for the adaptive training of machine learning models based on live performance metrics.

FIG. 6 illustrates an example simplified procedure for the adaptive training of machine learning models based on live performance metrics, in accordance with one or more embodiments described herein. For example, a non-generic, specifically configured device may perform procedure 600 by executing stored instructions, to provide an ML Ops service to one or more networks. The procedure 600 may start at step 605, and continues to step 610, where, as described in greater detail above, the device may deploy a first machine learning model to an inference location in a network. The model may be used at the inference location to make inferences about the network, such as predicting failures in the network (e.g., onboarding failures in a wireless network, tunnel failures in an SD-WAN), the device types of endpoints in the network, or the like. In various embodiments, the inference location may be a router, switch, wireless access point controller (WLC), or other form of networking equipment in the network.

At step 615, as detailed above, the device may receive, from the inference location, an indication that the first machine learning model is exhibiting poor performance. For instance, the indication may indicate the accuracy, precision, recall, accuracy, combinations thereof, or the like, regarding the first machine learning model. In some cases, the received indication may comprise time series information for the performance metric(s) and may be reported to the device when the performance of the model is below an expected threshold. In further embodiments, the indication may also indicate a shifted input data distribution for the first machine learning model.

At step 620, the device may identify a corrective measure for the poor performance that minimizes resource consumption by the model training pipeline of the device, as described in greater detail above. In general, the device may select the corrective measure from among a set of possible corrective measures, so as to favor the measure that addresses the poor performance of the first machine learning model with the least resource consumption of the device. In other words, training a new replacement for the machine learning model from scratch may be quite resource-intensive and disfavored in view of other options.

In some embodiments, the device may identify the corrective measure by selecting an existing, second machine learning model for deployment to the inference location from among a plurality of existing machine learning models, based on the second machine learning model being trained on an input data distribution that matches the shifted input data distribution for the first machine learning model. In another embodiment, the corrective measure comprises incrementally retraining the first machine learning model and the device may generate a second machine learning model by incrementally retraining the first machine learning model using more recent data than was initially used to train the first machine learning model. In a further embodiment, the corrective measure may entail rescaling the input features of the first machine learning model. In another embodiment, the corrective measure may comprise generating a new model and the device may generate a plurality of machine learning models, based on a resource consumption budget (e.g., a max number of models to train, a number of configurations to evaluate, a dataset size, etc.), and select a second machine learning model from among the plurality of machine learning models for deployment to the inference location.

At step 625, as detailed above, the device may deploy a second machine learning model to the inference location, based on the corrective measure. In turn, the second machine learning model is used in lieu of the first machine learning model to make the inferences about the network. In some embodiments, the device may also identify, using a dependency graph, one or more other machine learning models used at the inference location that depend on an output of the first machine learning model. This allows the device to proactively send, in response to the indication that the first machine learning model is exhibiting poor performance, one or more replacement machine learning models to the inference location to be used in lieu of the one or more other machine learning models that depend on the output of the first machine learning model. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the adaptive training of machine learning models based on live performance metrics. Indeed, it is to be expected that the performance of a deployed machine learning model may degrade over time for various reasons such as data quality issues (e.g., data distribution changes in the data ingested by the model), training issues, or the like. Accordingly, the techniques herein introduce a number of mechanisms to address the issue of degraded model performance over time in a manner that reduces resource consumption by the model training pipeline.

While there have been shown and described illustrative embodiments that provide for the adaptive training of machine learning models, it is to be understood that various other adaptations and modifications may be made within the spirit and scope of the embodiments herein. For example, while certain embodiments are described herein with respect to using certain models for purposes of network monitoring, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
deploying, by a device, a first machine learning model to an inference location in a network, wherein the first machine learning model is used at the inference location to make inferences about the network;
receiving, at the device and from the inference location, an indication that the first machine learning model is exhibiting poor performance based on a performance threshold;
identifying, by the device, a corrective measure for the poor performance that minimizes resource consumption by a model training pipeline of device;
deploying, by the device and based on the corrective measure, a second machine learning model to the inference location, wherein the second machine learning model is used in lieu of the first machine learning model to make the inferences about the network;
identifying, by the device, one or more other machine learning models used at the inference location that depend on an output of the first machine learning model; and
proactively sending, by the device and in response to the indication that the first machine learning model is exhibiting poor performance, one or more replacement machine learning models to the inference location to be used in lieu of the one or more other machine learning models that depend on the output of the first machine learning model.

2. The method as in claim 1, wherein the inference location is a router, switch, or wireless access point controller in the network.

3. The method as in claim 1, wherein the indication further indicates a shifted input data distribution for the first machine learning model, and wherein identifying the corrective measure for the poor performance comprises:
   selecting the second machine learning model for deployment to the inference location from among a plurality of existing machine learning models, based on the second machine learning model being trained on an input data distribution that matches the shifted input data distribution for the first machine learning model.

4. The method as in claim 1, wherein the corrective measure comprises incrementally retraining the first machine learning model, the method further comprising:
   generating the second machine learning model by incrementally retraining the first machine learning model using more recent data than was initially used to train the first machine learning model.

5. The method as in claim 1, wherein the one or more other machine learning models used at the inference location that depend on the output of the first machine learning model are identified using a dependency graph.

6. The method as in claim 1, wherein the corrective measure comprises rescaling input features of the first machine learning model, the method further comprising:
   generating the second machine learning model by rescaling the input features of the first machine learning model.

7. The method as in claim 1, wherein the corrective measure comprises generating a new machine learning model, the method further comprising:
   generating a plurality of machine learning models, based on a resource consumption budget; and
   selecting the second machine learning model from among the plurality of machine learning models for deployment to the inference location.

8. The method as in claim 1, wherein the corrective measure is identified based in part on a number of inference locations to which the first machine learning model was deployed that reported that the first machine learning model exhibited poor performance.

9. The method as in claim 1, wherein the inferences about the network comprise predicted failures in the network.

10. An apparatus, comprising:
    one or more network interfaces;
    a processor coupled to the one or more network interfaces; and
    a memory configured to store a process that is executable by the processor, the process when executed configured to:
        deploy a first machine learning model to an inference location in a network, wherein the first machine learning model is used at the inference location to make inferences about the network;
        receive, from the inference location, an indication that the first machine learning model is exhibiting poor performance based on a performance threshold;
        identify a corrective measure for the poor performance that minimizes resource consumption by a model training pipeline of the apparatus;
        deploy, based on the corrective measure, a second machine learning model to the inference location, wherein the second machine learning model is used in lieu of the first machine learning model to make the inferences about the network;
        identify one or more other machine learning models used at the inference location that depend on an output of the first machine learning model; and
        proactively send, in response to the indication that the first machine learning model is exhibiting poor performance, one or more replacement machine learning models to the inference location to be used in lieu of the one or more other machine learning models that depend on the output of the first machine learning model.

11. The apparatus as in claim 10, wherein the inference location is a router, switch, or wireless access point controller in the network.

12. The apparatus as in claim 10, wherein the indication further indicates a shifted input data distribution for the first machine learning model, and wherein the apparatus indicates the corrective measure for the poor performance by:
    selecting the second machine learning model for deployment to the inference location from among a plurality of existing machine learning models, based on the second machine learning model being trained on an input data distribution that matches the shifted input data distribution for the first machine learning model.

13. The apparatus as in claim 10, wherein the corrective measure comprises incrementally retraining the first machine learning model, the process when executed further configured to:
    generate the second machine learning model by incrementally retraining the first machine learning model using more recent data than was initially used to train the first machine learning model.

14. The apparatus as in claim 10, wherein the one or more other machine learning models used at the inference location that depend on the output of the first machine learning model are identified using a dependency graph.

15. The apparatus as in claim 10, wherein the corrective measure comprises rescaling input features of the first machine learning model, the process when executed further configured to:
    generate the second machine learning model by rescaling the input features of the first machine learning model.

16. The apparatus as in claim 10, wherein the corrective measure comprises generating a new machine learning model, the process when executed further configured to:
    generate a plurality of machine learning models, based on a resource consumption budget; and
    select the second machine learning model from among the plurality of machine learning models for deployment to the inference location.

17. The apparatus as in claim 10, wherein the corrective measure is identified based in part on a number of inference locations to which the first machine learning model was deployed that reported that the first machine learning model exhibited poor performance.

18. The apparatus as in claim 10, wherein the inferences about the network comprise predicted failures in the network.

19. A tangible, non-transitory, computer-readable medium storing program instructions that cause a device to execute a process comprising:
    deploying, by the device, a first machine learning model to an inference location in a network, wherein the first machine learning model is used at the inference location to make inferences about the network;

receiving, at the device and from the inference location, an indication that the first machine learning model is exhibiting poor performance;

identifying, by the device, a corrective measure for the poor performance that minimizes resource consumption by a model training pipeline of the device;

deploying, by the device and based on the corrective measure, a second machine learning model to the inference location, wherein the second machine learning model is used in lieu of the first machine learning model to make the inferences about the network;

identifying, by the device, one or more other machine learning models used at the inference location that depend on an output of the first machine learning model; and proactively sending, by the device and in response to the indication that the first machine learning model is exhibiting poor performance, one or more replacement machine learning models to the inference location to be used in lieu of the one or more other machine learning models that depend on the output of the first machine learning model.

20. The computer-readable medium as in claim 19, wherein the one or more other machine learning models used at the inference location that depend on the output of the first machine learning model are identified using a dependency graph.

\* \* \* \* \*

UNITED STATES PATENT AND TRADEMARK OFFICE
CERTIFICATE OF CORRECTION

PATENT NO. : 11,438,406 B2
APPLICATION NO. : 16/865517
DATED : September 6, 2022
INVENTOR(S) : Grégory Mermoud It is certified that error appears in the above-identified patent and that said Letters Patent is hereby corrected as shown below:

In the Specification

Column 7, Line 48, please amend as shown:
AP1 through nth access point, APn) through which endpoint Column 7, Line 63, please amend as shown:
AP1 through nth access point APm) that provide connectiv- Column 12, Line 20, please amend as shown:
trying too many models may lead to overfitting (e.g., to the Column 12, Line 31, please amend as shown:
Large-scale machine learning systems may use hundreds of Column 14, Line 1, please amend as shown:
may compute the final output of the ensemble using a variety Column 15, Line 3, please amend as shown:
model with more recent data or rescaling the input features Column 15, Line 9, please amend as shown:
models may lead to some form of overfitting (eg., to the valida- Column 18, Line 56, please amend as shown:
tion by a model training pipeline of the device;

Signed and Sealed this
Twentieth Day of December, 2022

Katherine Kelly Vidal
*Director of the United States Patent and Trademark Office*